United States Patent
Kim et al.

(10) Patent No.: US 10,941,255 B2
(45) Date of Patent: Mar. 9, 2021

(54) METHOD FOR MANUFACTURING LIGHTWEIGHT FOAMED RECYCLED LEATHER AND RECYCLED LEATHER PRODUCED BY THE METHOD THEREOF

(71) Applicants: ENR CO., LTD., Busan (KR); KOREA INSTITUTE OF FOOTWEAR & LEATHER TECHNOLOGY, Busan (KR)

(72) Inventors: Soon Bae Kim, Busan (KR); Won Ju Kim, Busan (KR); Eun Chul Shin, Yangsan-si (KR); Yeong Woo Kim, Busan (KR)

(73) Assignees: ENR CO., LTD., Busan (KR); KOREA INSTITUTE OF FOOTWEAR & LEATHER TECHNOLOGY, Busan (KR)

( * ) Notice: Subject to any disclaimer, the term of this patent is extended or adjusted under 35 U.S.C. 154(b) by 0 days.

(21) Appl. No.: 16/373,413

(22) Filed: Apr. 2, 2019

(65) Prior Publication Data

US 2019/0367684 A1 Dec. 5, 2019

(30) Foreign Application Priority Data

May 30, 2018 (KR) .................. 10-2018-0061789

(51) Int. Cl.
| | | |
|---|---|---|
| C08H 1/06 | (2006.01) | |
| C08J 3/12 | (2006.01) | |
| C08J 3/26 | (2006.01) | |
| C08F 6/22 | (2006.01) | |

(52) U.S. Cl.
CPC .............. C08H 1/06 (2013.01); C08F 6/22 (2013.01); C08J 3/12 (2013.01); C08J 3/26 (2013.01); C08J 2389/06 (2013.01)

(58) Field of Classification Search
CPC ... C08H 1/06; C08H 3/12; C08H 3/26; C08H 6/22; C08J 2389/06
See application file for complete search history.

(56) References Cited

U.S. PATENT DOCUMENTS

2013/0198974 A1* 8/2013 Reineking ................ C14C 3/00
                                                                    8/436

FOREIGN PATENT DOCUMENTS

| JP | 08089675 | * | 4/1996 | ............... B68F 1/00 |
|---|---|---|---|---|
| KR | 10-1991-0014517 A | | 8/1991 | |
| KR | 10-1998-0016580 A | | 6/1998 | |
| KR | 1019960036188 | * | 4/1999 | ............... C14B 7/06 |
| KR | 10-2008-0058495 A | | 6/2008 | |
| KR | 10-2010-0031650 A | | 3/2010 | |
| KR | 10-2017-0010998 A | | 2/2017 | |
| KR | 10-1752176 B1 | | 7/2017 | |

* cited by examiner

*Primary Examiner* — Amina S Khan
(74) *Attorney, Agent, or Firm* — Goldilocks Zone IP Law

(57) ABSTRACT

A method of making a lightweight foamed recycled leather is described. The method includes pulverizing the collagen fiber waste generated in a controlling a thickness of the leather during a leather process; neutralizing the resultant of step (a) by a soda ash with a water; (c) dyeing and fat-liquoring process treating the resultant of the step (c); (d) mixing a latex, a dispersant, a coagulant, and a thermally expandable microspheres with the resultant of step (c); (e) coagulating a collagen fiber powder and the latex by adding a coagulant into the resultant of step (d); (f) dehydrating and drying the resultant of step (e); and (g) heat treating the resultant of step (f) to foam thermally expandable microspheres, thereby to impart functionality to the recycled leather.

1 Claim, No Drawings

METHOD FOR MANUFACTURING LIGHTWEIGHT FOAMED RECYCLED LEATHER AND RECYCLED LEATHER PRODUCED BY THE METHOD THEREOF

CROSS-REFERENCE TO RELATED APPLICATIONS

This application claims priority under 35 U.S.C. § 119 to Korean Patent Application No. 10-2018-0061789 filed on May 30, 2018 in the Korean Intellectual Property Office, the disclosure of which is incorporated herein by reference in its entirety.

BACKGROUND

The present invention relates to a foamed recycled leather of a lightweight material, and more particularly, to a recycled leather recycled from a collagen fiber waste, which is one type of leather waste generated during a tanning process, and is environmentally friendly. A method of manufacturing a lightweight foamed recycled leather capable of providing a recycled leather material which can be used in various applications such as a shoes upper, a footwear upper, a material for comfort shoes, a bag, a furniture, an automobile seat, etc. and the like.

Background Art

As is well known, wastes generated when processing artificial leather, natural leather, or various kinds of fibers and the like and scraps left by using them are utilized in various fields, but their application ranges are very limited.

And leather wastes and scrap are mostly disposed of by landfill or incineration, which causes serious environmental problems.

In particular, natural leather is a tough shell that encloses the body of an animal and is widely used in various fields such as bags, shoes, and furniture due to its excellent physical properties.

Such natural leather is separated from the animal body and then made into a product through chemical and physical processing. It is necessary to cut a product, i.e., a cutting process, in accordance with the design of the desired product during various stages of processing. However, environmental problems were serious because a large amount of leather waste are generated during the cutting process and most of the leather waste is disposed of by incineration and/or landfill.

The main reason that various kinds of wastes such as natural leather, artificial leather, fiber, or scrap cause environmental problems is the fact that waste and scrap can not be recycled by incineration or landfill due to a lowered recycling rate.

Among the various wastes, the wastes generated for controlling a thickness of the leather, i.e., a skiving process, during the leather-making process of the natural leather are used as recycled leather materials. Such recycled leather materials are made to have properties similar to a leather by utilizing natural leather wastes used.

Although various methods have been disclosed in the following references for producing such a recycled leather, there is currently no separate weight-saving technique for producing recycled leather. Therefore, such as sports shoes, safety shoes, comport shoes, a bag, and furniture materials, all of the recycled leather materials are inevitably heavy.

RELATED ARTS

Patent Documents

Patent Document 1: Published Patent Publication No. KR10-2017-0010998, Title of Invention: Process for preparing a regenerated leather based on leather processing wastes, Publication Date: Feb. 2, 2017.

Patent Document 2: Patent Registration No. KR10-1752176, Title of Invention: Manufacturing Method Of Recycling Leather Sheet Using Fiber Of Leather, Publication Date: Jul. 4, 2017.

Patent Document 3: Published Patent Publication No. KR10-1991-0014517 (Title of Invention: Manufacturing method of recycled leather using leather waste, Publication Date: Aug. 31, 1991.

Patent Document 4: Published Patent Publication No. KR10-2010-0031650, Title of Invention: Regenerated Leather, Publication Date: Mar. 24, 2010.

DISCLOSURES

Technical Solution

It is an object of the present invention to provide a method of producing a lightweight foamed recycled leather, which is environmentally friendly and lightweight by using a collagen fiber, which is a waste material of the leather, generated during a tanning process, and a recycled leather produced by the method.

Solution to the Problem a method of manufacturing lightweight foamed recycled leather according to aspect(s) of the present invention may include a step of pulverizing collagen fiber waste generated for controlling a thickness of leather, i.e., a skiving process, during a leather process, a step of neutralizing the resultant product of the previous step by treating soda ash as a neutralizing agent with water and, treating the resultant product of the previous stage with a dyeing and branching process, and mixing the resultant product with the latex, dispersant, defoamer and thermally expandable microspheres, a step of adding a coagulant to the result of the previous step to coagulate the collagen fiber powder and the latex, a step of dehydrating the resultant product of the previous step by vacuum dehydration and roll press, followed by drying through hot air drying, and applying heat treatment to the resultant product of the previous step at a high temperature to foil the thermally expandable microspheres to impart functionality to the recycled leather.

Effect of Invention

Aspects of the present invention have advantages of being environmentally friendly and enhancing lightweight properties by manufacturing recycled leather using collagen fibers, which are leather wastes, and thermally expandable microspheres.

A recycled leather of the present invention produced by this method is used for industrial, shoe, and building materials, and more particularly can be used for various purposes such as a sneaker upper, a safety shoes upper, a comfort shoes, a bag, a furniture material, an automobile seat and the like.

DETAILED DESCRIPTION OF THE INVENTION

Preferred embodiments of the present invention will be described in detail. In the following detailed description, exemplary embodiments of the present invention will be described in order to accomplish the above-mentioned technical problems. And other embodiments which may be presented by an embodiment of the present invention may be replaced by descriptions in the constitution of the present invention.

According to aspect(s) of the present invention, a method of producing a lightweight foamed recycled leather is provided, which is environmentally friendly and lightweight is improved by using collagen fiber waste, which is one kind of leather waste generated during a leather-making process, in manufacturing recycled leather.

Specifically, the present invention produces a lightweight foamed and regenerated leather while proceeding in steps (a) to (g) of the seven steps.

In the step (a), the collagen fiber, which is a waste generated for controlling the thickness of the leather during a conventional tanning process, is pulverized using a conventional pulverizer.

At this time, various scraps, textile scraps, fabric scraps, synthetic leather scraps, etc., which are generated in the production of shoe, may be used instead of the waste according to aspect(s) of the present invention.

In step (b), the resultant product of step (a) is neutralized by treating with water and a soda ash a neutralizing agent. In step (c), the resultant product of step (b) processed for dyeing and fat-liquoring processes.

At this time, the soda ash is used as the neutralizing agent, and neutralization of the pH of the acidic raw material suppresses an excessive coagulation during a latex treatment.

In addition, the fat-liquoring process improves a flexibility of the recycled leather, and further promotes the dehydration during the production of the recycled leather, thereby improving the productivity.

In step (d), a latex, a dispersant, an antifoaming agent, and a thermally expandable microsphere are mixed with the resultant product of the fat-liquoring process in the step (c).

The latex is served as a binder for binding collagen fibers as a raw material. As the dispersing agent, a latex dispersing agent is used, and it plays a role of suppressing excessive coagulation of the latex.

As an antifoaming agent, a general-purpose latex antifoaming agent is used, and the antifoaming agent is used to suppress bubbles which may occur during the latex treatment. The micro spares may serve to impart lightness to the recycled leather.

In step (e), a coagulant is added to the resultant product of step (d) to coagulate the collagen fiber powder and the latex. In step (f), a vacuum dehydration and a roll press dehydration is performed to the resultant product of step (e), and then a hot air drying is performed for further dehydration of the resultant product of the step (e).

At this time, in the vacuum dehydration process, dehydration is performed through a vacuum line to form a sheet when a mixed liquid, i.e., a mixed liquid of the collagen fiver powder and the latex, is distributed to the vacuum line after the latex coagulation process.

In addition, after the vacuum dehydration process, the roll pressing is performed according to a thickness of the product produced by using a roll press in order to improve the binding force of the recycled leather and further reduce the remaining water content.

The hot air dry process is performed in a drying chamber at a temperature of 70 to 110° C. for 4 to 6 minutes to dry the recycled leather.

In a step (g), the resultant product of step (f) is heat treated at a high temperature, preferably 80 to 130° C., to foam thermally expandable microspheres to impart functionality, specifically, light weight of recycled leather, thereby the lightweight foamed recycled leather can be produced according to an aspect of the present invention.

The temperature in a range of 80 to 130° C. is a minimum foaming temperature and an efficiency optimum temperature of the thermally expandable microspheres.

The recycled leather produced by the above-mentioned method is used for various purposes such as shoes, industrial use, construction materials, and the like.

Typical examples of the recycled leather are used for a sneaker upper and a safety shoes upper comfort shoes, bags, furniture materials, and the like.

That is, it can be applied to all leather products requiring a light weight property.

Hereinafter, aspect(s) of the present invention will be described in detail with reference to the preferred embodiments of the present invention, but the present invention is not limited thereto.

Example 1

The collagen fiber waste generated in a tanning process is pulverized for 10 to 120 minutes and powdered, and then soda ash is treated in a mixing tank so that the collagen fiber powder has a pH of 6 to 7.

At this time, the pH of the collagen fiber powder is adjusted to 6 to 7 in order to prevent excessive coagulation during a latex treatment.

After the latex treatment, 0.1 to 5% by weight of a dye and 1 to 30% by weight of a fat-liquoring agent are performed with respect to a whole mixture, and then a dyeing and fat-liquoring process for 10 to 120 minutes for a beautiful color and flexibility.

Next, 10 to 50% by weight of latex as a bonding material, 1 to 10% by weight of a dispersant, a defoaming agent and a thermo-expandable microsphere are mixed in an amount of 1 to 30% by weight based on the raw material content, 0.1 to 30% by weight of $Al_2(SO_4)_3$, which is a coagulant, is coagulated, and the mixture is formed into a sheet, followed by vacuum, compression, dehydration, and drying to produce a recycled leather sheet.

Thereafter, the recycled leather is foamed through a heat treatment at 80 to 130° C. to produce a leather product.

The leather produced according to the process of example 1 described above can be used as a material for a footwear such as a sneaker upper or a safety shoes upper, or as a bag material, and is not limited to a material for manufacturing a specific product.

Comparative Example 1

Except that the functional microspheres were not treated, and all of the steps and products may be the same conditions except for the post-drying heat treatment step to produce recycled leather.

Meanwhile, according to an aspect of the present invention, evaluation of the physical properties of recycled leather produced by treating thermally expandable microspheres was carried out, as shown in Table 1 below.

The properties of the recycled leather prepared according to the examples and comparative examples were prepared as shown in Table 1 below, and specific gravities and light weight properties of each sample were analyzed.

The results of the measurements are shown in Table 1.

At this time, the light weight property is a weight reduction ratio for the comparative example of the conventional recycled leather.

TABLE 1

| Classification | Example 1 | Comparative example |
|---|---|---|
| weight | 0.14 | 0.58 |
| Light weight property (%) | 76 | 0 |

What is claimed is:

1. A method of making a lightweight foamed recycled leather, wherein the method consists of the following steps in sequential order:

(a) pulverizing the collagen fiber waste generated in a controlling a thickness of the leather during a leather process;
(b) neutralizing the resultant of step (a) by a soda ash with a water for having the collagen fiber powder has a pH in a range of 6 to 7;
(c) dyeing and fat-liquoring process treating the resultant of the step (b) for 10 to 120 minutes by adding 0.1 to 5% weight of a dye and 1 to 30% weight of a fat-liquoring agent with respect to a whole mixture;
(d) mixing a latex, a dispersant, a defoaming agent, and a thermally expandable microspheres with the resultant of step (c);
(e) coagulating a collagen fiber powder and the latex by adding a coagulant into the resultant of step (d);
(f) dehydrating and drying the resultant of step (e); and
(g) heat treating the resultant of step (f) to foam thermally expandable microspheres, thereby to impart functionality to the recycled leather,
wherein the coagulant is $Al_2(SO_4)_3$ is in a range of 0.1 to 30% by weight,
wherein the heat treating in step (g) is performed at 80-130° C.

* * * * *